(12) United States Patent
Choi et al.

(10) Patent No.: US 12,002,990 B2
(45) Date of Patent: Jun. 4, 2024

(54) POROUS SEPARATOR AND LITHIUM SECONDARY BATTERY COMPRISING SAME (71) Applicant: LG CHEM, LTD., Seoul (KR)

(72) Inventors: Woongchul Choi, Daejeon (KR); Junghun Choi, Daejeon (KR); Yonghee Kang, Daejeon (KR); Minchul Jang, Daejeon (KR); Suk Il Youn, Daejeon (KR); Byoungkuk Son, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 424 days.

(21) Appl. No.: 17/279,070

(22) PCT Filed: Oct. 11, 2019

(86) PCT No.: PCT/KR2019/013361
§ 371 (c)(1),
(2) Date: Mar. 23, 2021

(87) PCT Pub. No.: WO2020/076121
PCT Pub. Date: Apr. 16, 2020

(65) Prior Publication Data
US 2022/0052421 A1 Feb. 17, 2022

(30) Foreign Application Priority Data
Oct. 12, 2018 (KR) .................. 10-2018-0122101

(51) Int. Cl.
*H01M 50/457* (2021.01)
*H01M 4/02* (2006.01)
*H01M 4/38* (2006.01)
*H01M 4/40* (2006.01)
*H01M 10/052* (2010.01)
*H01M 50/434* (2021.01)
*H01M 50/443* (2021.01)
*H01M 50/446* (2021.01)
*H01M 50/489* (2021.01)
*H01M 50/491* (2021.01)

(52) U.S. Cl.
CPC .......... *H01M 50/457* (2021.01); *H01M 4/382* (2013.01); *H01M 4/405* (2013.01); *H01M 10/052* (2013.01); *H01M 50/434* (2021.01); *H01M 50/443* (2021.01); *H01M 50/446* (2021.01); *H01M 50/489* (2021.01); *H01M 50/491* (2021.01); *H01M 2004/027* (2013.01)

(58) Field of Classification Search
None
See application file for complete search history.

(56) References Cited

U.S. PATENT DOCUMENTS

| | | | | |
|---|---|---|---|---|
| 5,948,569 | A * | 9/1999 | Moses | H01M 10/4235 429/231.95 |
| 2005/0266292 | A1* | 12/2005 | Kim | H01M 50/434 429/141 |
| 2006/0202251 | A1* | 9/2006 | Bhattacharyya | H01L 29/7926 257/314 |
| 2007/0190408 | A1 | 8/2007 | Inoue et al. | |
| 2007/0264577 | A1 | 11/2007 | Katayama et al. | |
| 2011/0039145 | A1 | 2/2011 | Abe et al. | |
| 2012/0015232 | A1 | 1/2012 | Teshima et al. | |
| 2012/0270090 | A1 | 10/2012 | Shinohara et al. | |
| 2014/0038024 | A1* | 2/2014 | Huang | H01M 50/44 429/144 |
| 2014/0248525 | A1 | 9/2014 | Iwai et al. | |
| 2015/0050544 | A1 | 2/2015 | Nam et al. | |
| 2015/0171397 | A1* | 6/2015 | Yamada | H01M 50/434 429/144 |
| 2017/0133653 | A1* | 5/2017 | Lee | H01M 50/434 |
| 2019/0245182 | A1 | 8/2019 | Liao et al. | |

FOREIGN PATENT DOCUMENTS

| | | |
|---|---|---|
| CN | 104350631 A | 2/2015 |
| CN | 107275550 A | 10/2017 |
| EP | 3327853 A1 | 5/2018 |
| JP | 2008-004438 * | 1/2008 |
| JP | 2008-210791 A | 9/2008 |
| JP | 2008-243825 A | 10/2008 |
| JP | 2009-064566 A | 3/2009 |
| JP | 2012-043628 * | 3/2012 |
| JP | 2013-222581 A | 10/2013 |
| JP | 2015-088430 A | 5/2015 |
| JP | 2015-519686 A | 7/2015 |
| KR | 10-2008-0082289 A | 9/2008 |
| KR | 10-2010-0135955 A | 12/2010 |

(Continued)

OTHER PUBLICATIONS

Machine translation of JP 2012-043628, published on Mar. 1, 2012 (Year: 2012).*

(Continued)

*Primary Examiner* — Anca Eoff (74) *Attorney, Agent, or Firm* — MORGAN, LEWIS & BOCKIUS LLP (57) ABSTRACT The present invention relates to a porous separator comprising a porous layer containing a plurality of plate-type inorganic particles and a first binder polymer positioned on part or all of the surface of the plate-type inorganic particles to connect and fix between the plate-type inorganic particles; and a metal layer formed on any one surface of the porous layer, and a lithium secondary battery comprising the same.

15 Claims, 2 Drawing Sheets

(56) References Cited

FOREIGN PATENT DOCUMENTS

| | | |
|---|---|---|
| KR | 10-1229902 B1 | 1/2013 |
| KR | 10-2013-0133446 A | 12/2013 |
| KR | 10-2015-0019991 A | 2/2015 |
| KR | 10-2015-0047875 A | 5/2015 |
| KR | 10-2015-0099648 A | 9/2015 |
| KR | 10-2016-0007147 A | 1/2016 |
| KR | 10-2017-0053448 A | 5/2017 |
| KR | 10-1758946 B1 | 7/2017 |
| WO | 2010/138177 A1 | 12/2010 |
| WO | 2013/154623 A1 | 10/2013 |
| WO | 2017/018483 A1 | 2/2017 |
| WO | 2017/033993 A1 | 3/2017 |

OTHER PUBLICATIONS

Machine translation of JP 2008-004438, published on Jan. 10, 2008 (Year: 2008).*
Titanium Dioxide-Titania (TiO2), Jan. 11, 2002 (Year: 2002).*
Extended European Search Report dated Oct. 7, 2021 issued by the European Patent Office in corresponding European Patent Application No. 19871461.0.
Office Action issued in corresponding Chinese Patent Application No. 201980050031.9 dated Jul. 28, 2022.
International Search Report (with partial translation) and Written Opinion dated Jan. 28, 2020, issued in corresponding International Patent Application No. PCT/KR2019/013361.

\* cited by examiner

POROUS SEPARATOR AND LITHIUM SECONDARY BATTERY COMPRISING SAME

CROSS-REFERENCE TO RELATED APPLICATIONS

The present application is a National State filing under 35 U.S.C. 371 of the international application No. PCT/KR2019/013361 filed on Oct. 11, 2019, which claims the benefit of priority based on Korean Patent Application No. 10-2018-0122101 filed on Oct. 12, 2018, all the contents of which is incorporated herein by reference.

TECHNICAL FIELD

The present invention relates to a porous separator and a lithium secondary battery including the same, which can block lithium ion dendrites and has improved high temperature safety by excellent thermal properties.

BACKGROUND ART

Recently, there is increasing interest in energy storage technology. As the application area thereof extends to the energy for mobile phones, camcorders, notebook PCs, and even electric vehicles, the effort of research and development of electrochemical devices is being carried out more and more concretely. Electrochemical devices are the most noteworthy area in this respect, and among them, the development of a secondary battery capable of charging/discharging is the focus of attention. Recently, in developing these batteries, research and development on the design of new electrodes and batteries have been conducted in order to improve capacity density and specific energy.

Among the secondary batteries currently being applied, the lithium secondary battery developed in the early 1990s is attracting much attention as there is an advantage in that it has much higher operating voltage and energy density than conventional batteries such as Ni-MH, Ni—Cd, and sulfuric acid-lead batteries using an electrolyte solution in the form of an aqueous solution. However, the lithium ion battery has safety problems such as ignition and explosion due to the use of an organic electrolyte solution, and has a disadvantage of being difficult to manufacture.

The recent lithium ion polymer battery is regarded as one of the next generation battery by improving the weaknesses of this lithium ion battery, but the capacity of the battery is still relatively low compared to the lithium ion battery, and in particular, the discharge capacity at low temperatures is insufficient, and improvements for this are urgently required.

Electrochemical devices as described above are produced by many companies, but their safety characteristics represent different aspects. It is very important to evaluate the safety of these electrochemical devices and to ensure their safety. The most important consideration is that the electrochemical device should not cause injury to the user in the event of a malfunction. For this purpose, the safety standard strictly regulates ignition and smoke in electrochemical devices. In the safety characteristics of an electrochemical device, if the electrochemical device is overheated and thus shows thermal runaway, or the separator is penetrated, there is a high risk of causing an explosion. In particular, a polyolefin-based porous substrate, which is commonly used as a separator for the electrochemical device, exhibited extreme heat shrinkage behavior at the temperature of 100° C. or more due to the property of the material and the property of the preparation process including stretching, thereby causing the short circuit between the positive electrode and negative electrode.

In order to solve the safety problem of the electrochemical device as mentioned above, a separator having a porous organic-inorganic coating layer formed by coating an excess mixture of inorganic particles and binder polymer on at least one side of the polyolefin-based porous substrate with multiple pores has been proposed.

However, in this case, the porous layer may have coating defects on the surface due to cracks occurring during the manufacturing process, for example, a drying process. Thus, the organic/inorganic composite porous layer can be easily detached from the polyolefin-based porous substrate when the secondary battery is assembled or when the battery is used, which leads to deterioration of the safety of the battery. Also, in order to form the porous layer, the slurry for forming the porous layer applied to the polyolefin-based porous substrate has a problem in that the degree of compaction of the particles is increased during drying, thereby resulting in densely packed parts and thus lowering air permeability.

In addition, there is a problem that the heavy metal components inevitably mixed in the manufacturing process of the electrode plate of the battery and the preparation process of the raw materials are deposited on the surface of the negative electrode as they are redoxed during the activation of the battery, and as a result, acicular crystals (dendrites) of metal lithium cause micro-short on the positive electrode or the negative electrode, thereby causing a voltage drop of the battery.

Thus, there is still a need for improved separators that can contribute to the stability of the battery, in terms of the characteristics of the battery industry that require ever higher levels of stability.

(Patent document 1) Korean Laid-open Patent Publication No. 10-2015-0099648, SEPARATOR, METHOD OF MANUFACTURING THE SAME, LITHIUM POLYMER SECONDARY BATTERY INCLUDING THE SAME, AND METHOD OF MANUFACTURING LITHIUM POLYMER SECONDARY BATTERY USING THE SAME.

DISCLOSURE

Technical Problem

Therefore, the problem to be solved by the present invention is to provide a porous separator which can prevent a short circuit phenomenon between a positive electrode and a negative electrode due to the growth of dendrites and has improved high temperature safety by excellent thermal properties, and an electrochemical device comprising the same.

Technical Solution

In order to solve the above problem, the present invention includes a porous separator comprising a porous layer containing a plurality of plate-type inorganic particles and a first binder polymer positioned on part or all of the surface of the plate-type inorganic particles to connect and fix between the plate-type inorganic particles; and a metal layer formed on any one surface of the porous layer.

In addition, the present invention provides a lithium secondary battery comprising a positive electrode, a negative electrode, a separator interposed between the positive electrode and the negative electrode, wherein the separator is the porous separator described above.

Advantageous Effects

According to the present invention, by providing a base layer containing plate-type inorganic particles, the path between the positive electrode/negative electrode, that is, the so-called tortuosity can be increased, so that even if dendrites are generated in the battery, since the relevant dendrites become difficult to reach the positive electrode from the negative electrode, the reliability for the dendrite short can be further increased.

In addition, since the porous separator according to the present invention does not have a porous polymer base material, there is an effect of reducing the cost, the pore size and porosity of the whole separator can be controlled to realize a uniform porous separator, and the thickness of the separator can be made thin to reduce the weight. In addition, there is no phenomenon such as heat shrinkage even when exposed to high temperature of 120° C. or more, thereby having an advantage of improving the safety.

In addition, the porous separator according to the present invention has an advantage of suppressing the growth of Li dendrites by forming a metal having a low Li diffusion barrier through an evaporation process or a sputter process on the part where the negative electrode contacts.

In addition, the porous separator according to the present invention has an advantage of improving the output characteristics by coating a ceramic having a large dielectric constant on the part where the positive electrode contacts.

BEST MODE

Hereinafter, the present invention will be described in detail with reference to the accompanying drawings so that those skilled in the art can easily carry out the present invention. The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

In the drawings, in order to clearly illustrate the present invention, parts that are not related to the description of the present invention are omitted, and similar reference numerals are used for similar parts throughout the specification. Also, the size and relative size of the components shown in the figures are independent of the actual scale and may be reduced or exaggerated for clarity of description.

Porous Separator

The porous separator according to one embodiment of the present invention comprises a porous layer containing a plurality of plate-type inorganic particles and a first binder polymer positioned on part or all of the surface of the plate-type inorganic particles to connect and fix between the plate-type inorganic particles; and a metal layer formed on any one surface of the porous layer.

Since the porous separator of the present invention may serve as a separator by being interposed between the positive electrode and the negative electrode as described below, the porous separator may correspond to a porous separator (separating film, separator), and also may correspond to an organic-inorganic composite, because an organic material and an inorganic material are mixed in terms of components.

Since the organic-inorganic composite is composed of only an inorganic material and a binder polymer without a porous polymer base material such as polyolefin, the separator does not exhibit thermal shrinkage even when exposed to a high temperature of 120° C. or more as compared to a separator made of a conventional porous polymer base material, and is not decomposed or damaged even when the temperature rises near the melting point of the polymer substrate, and thus the possibility of a short circuit between the positive electrode and the negative electrode can be fundamentally blocked, and the thickness of the separator can be reduced to reduce the weight.

On the other hand, in order to safely use an electrochemical device such as a secondary battery for a long time, foreign metal ions in the battery generated during charging/discharging form dendrites by reduction at the surface of the negative electrode, and it is necessary to suppress the internal short phenomenon caused by these dendrites. In addition, in terms of quality in the manufacture of the cell, the dendrites resulting from the reduction of these metal ions during charging/discharging in the manufacturing process of the cell increase the defect rate during the manufacture of the cell. In addition, if the dendrites generated during the manufacturing process electrically connect the positive electrode and the negative electrode to each other due to external pressure or vibration, it may cause problems with the safety and stability of the battery even during use, and the reduction of additional metal ions generated during the use of the battery can also lead to the formation of dendrites, which can significantly impair the safety and stability of the cell. Therefore, in the lithium secondary battery as described above, it is necessary to suppress the formation and growth of dendrites that can electrically connect the positive electrode and the negative electrode inside the battery.

In the case of using a porous organic/inorganic layer with inorganic particles as a separator, the pore of the porous organic/inorganic layer, that is, the spacing and path between the inorganic particles, can greatly affect the growth of dendrites and the electrical short circuit phenomenon between the positive electrode and the negative electrode. Dendrites which are formed by the reduction and deposition of metal ions on the surface of the negative electrode can also be inhibited or delayed in their growth, if the time it takes for the metal ions to pass through the separator and thus to be transferred to the negative electrode becomes long, or even if metal ions pass through the separator and dendrites are deposited on the surface of the negative electrode, if the path leading to the positive electrode toward which metal ions are deposited and grown is complicated or the time required is increased.

The migration path in the porous organic/inorganic layer with inorganic particles affecting the deposition and growth of these foreign metal ions can be explained by tortuosity.

Figure 1:
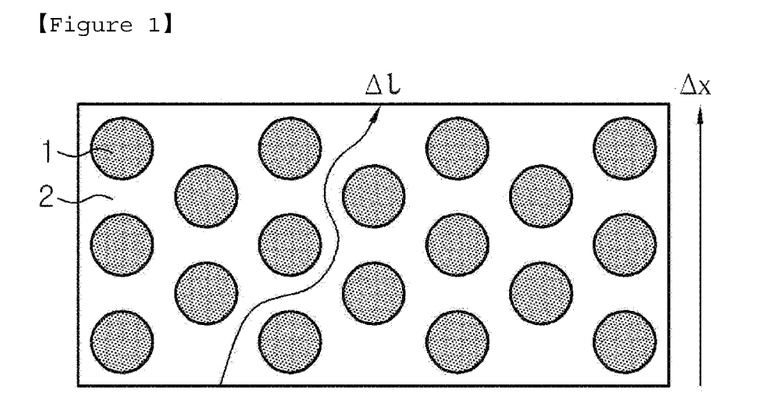
FIG. 1 is a schematic diagram illustrating tortuosity in a porous layer composed of inorganic particles.

The tortuosity is a value expressed by quantifying how much the curve is curved or twisted. This tortuosity is often used to describe diffusion that usually occurs in porous materials. Referring to FIG. 1, the tortuosity τ may be defined as follows.

$$\tau = \frac{\Delta_l}{\Delta_\chi},$$

wherein $\Delta_l$: actual travel length, $\Delta_\chi$: unit length.

That is, although the thickness of the porous layer composed of a plurality of particles 1 corresponds to $\Delta_\chi$, the time taken to pass from one side to the other through the pore 2 of the porous layer is proportional to the actual travel distance $\Delta_l$.

Figure 2:
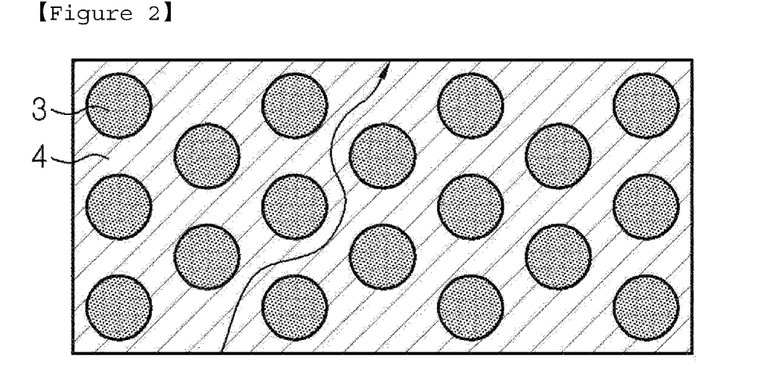
FIG. 2 is a schematic diagram illustrating tortuosity in a porous layer composed of spherical inorganic particles.
Figure 3:
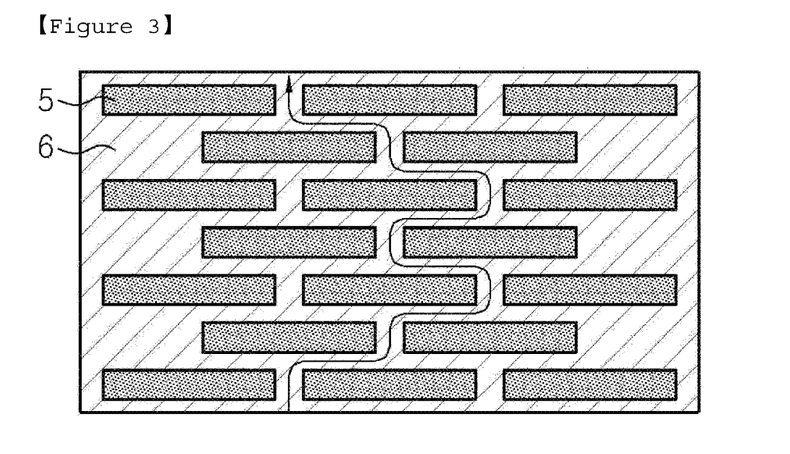
FIG. 3 is a schematic diagram illustrating tortuosity in a porous layer composed of plate-type inorganic particles.

Referring to FIGS. 2 and 3, it can be seen that depending on the type of the inorganic particles in the porous separator having the binder polymer and the inorganic particles, the actual travel distance may vary greatly. In the case where the shape of the inorganic particle 3 is spherical as shown in FIG. 2, the degree of torsion of the path through pore 4, 6 is small so that it can pass from one side to the other through a shorter travel length, as compared to the case where the shape of the inorganic particle 5 is a plate-type as shown in FIG. 3. From this, it can be seen that in the case where the shape of the inorganic particles of the porous separator is a plate-type, since the travel length is longer than that in the spherical form, and thus it takes much more time and is difficult for the dendrites formed on the surface of the negative electrode to grow, pass through the pores of the separator and connect to the positive electrode, the growth of dendrites and the resulting short circuit phenomenon are suppressed.

Therefore, the present invention is to provide a porous separator comprising a porous layer having plate-type inorganic particles.

Figure 4:
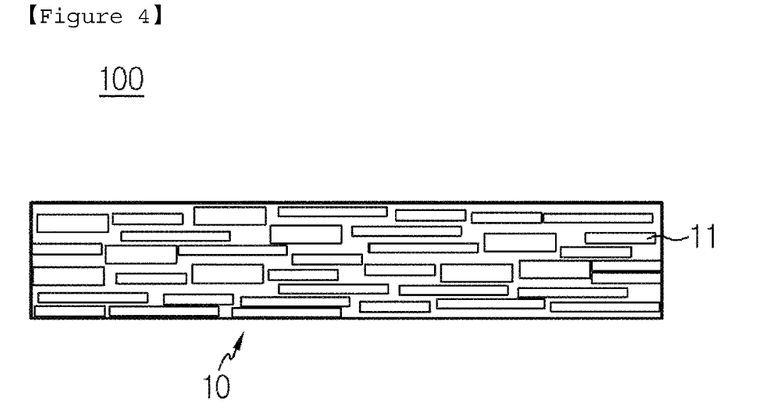
FIG. 4 is a schematic diagram of the porous separator according to one embodiment of the present invention.

Referring to FIG. 4, the porous separator 100 according to one embodiment of the present invention comprises a porous layer 10 containing a plurality of plate-type inorganic particles 11 and a first binder polymer (not shown) positioned on part or all of the surface of the plate-type inorganic particles 11 to connect and fix between the plate-type inorganic particles.

Also, according to one embodiment of the invention, a metal layer formed on any one surface of the porous layer may be comprised.

As the metal layer, a metal (M) having a low Li diffusion barrier, which may form an alloy of $Li_xM$ (x=1 to 2.25) by reacting with lithium, may be used. Here, "x is 1 to 2.25" means that x lithium meets metal (M) to form an alloy of $Li_xM$.

The copper current collector does not undergo an alloying reaction with lithium, so lithium plating takes place, requiring more energy than the metal where the alloying reaction occurs. Therefore, in the case of using lithium metal as a negative electrode, the growth of lithium during charging is concentrated in the region, where lithium is initially grown, to form dendrites, and as a result, there is a high probability that the growth of lithium does not occur throughout the surface of the copper current collector, but the growth of lithium will be concentrated in the local region where the growth of lithium begins.

However, if there is a metal layer with a low lithium diffusion barrier, the growth of lithium during charging does not occur in the local region but occurs evenly over a wide range, thereby resulting in the effect of inhibiting dendrite formation.

Specific examples of the metal (M) having a low Li diffusion barrier comprise Al, In, Au, Ni, Mg or the like.

The metal layer may have a thickness of 0.01 to 1 μm. As the metal layer is formed on any one surface of the porous layer, it is possible to suppress the growth of dendrite due to the growth of lithium metal.

Figure 5:
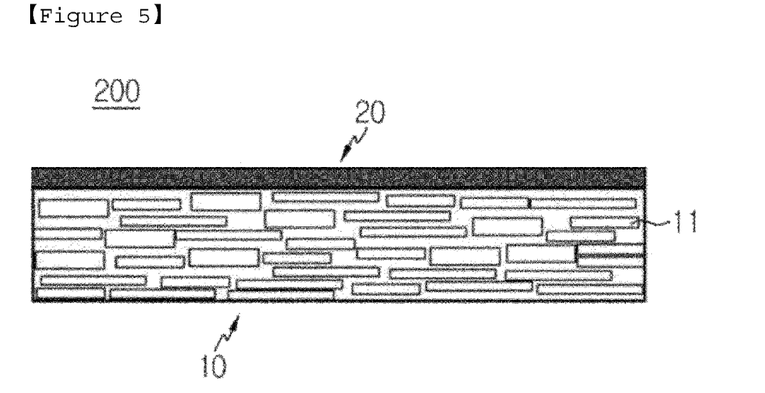
FIG. 5 is a schematic diagram of the porous separator according to one embodiment of the present invention.

Referring to FIG. 5, the porous separator 200 according to one embodiment of the present invention comprises a porous layer 10 containing a plurality of plate-type inorganic particles 11 and a first binder polymer (not shown) positioned on part or all of the surface of the plate-type inorganic particles 11 to connect and fix between the plate-type inorganic particles; and a metal layer 20 positioned on one surface of the base porous layer.

According to one embodiment of the present invention, the inorganic particles in the porous layer may be composed of only the plate-type inorganic particles, or may comprise the plate-type inorganic particles of 50% by weight or more, specifically 50 to 90% by weight, based on the total weight of the inorganic particles in the porous layer. In the latter case, it may further comprise spherical inorganic particles as the inorganic particles of the porous layer.

Non-limiting examples of the plate-type inorganic particles may comprise alumina, silica, zirconia, titanium dioxide, magnesia, ceria, yttrium oxide, zinc oxide, iron oxide, barium titanium oxide, alumina-silica composite oxide, or a mixture of two or more thereof.

Non-limiting examples of the spherical inorganic particles may comprise inorganic particles having a high dielectric constant of 5 or more, in particular 10 or more, inorganic particles having a lithium ion transfer ability, or mixtures thereof.

Non-limiting examples of the inorganic particles having the dielectric constant of 5 or more may comprise $BaTiO_3$, $Pb(Zr,Ti)O_3$(PZT), $Pb_{1-x}La_xZr_{1-y}Ti_yO_3$(PLZT), $PB(Mg_{3}Nb_{2/3})O_3$—$PbTiO_3$(PMN-PT), hafnia ($HfO_2$), $SrTiO_3$, $SnO_2$, $CeO_2$, MgO, NiO, Cao, ZnO, $ZrO_2$, $Y_2O_3$, $Al_2O_3$, $TiO_2$, SiC, AlO(OH), $Al_2O_3 \cdot H_2O$, or mixtures thereof.

In addition, the inorganic particles having a lithium ion transfer ability refers to inorganic particles that contain lithium elements but have a function of moving lithium ions without storing lithium. Non-limiting examples of the inorganic particles with lithium ion transport ability comprises lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), (LiAl-TiP)$_xO_y$, based glass (0<x<4, 0<y<13) such as $14Li_2O$-$9Al_2O_3$-$38TiO_2$-$39P_2O_5$, lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5) such as $Li_{3.25}Ge_{0.25}P_{0.75}S_4$, lithium nitride ($Li_xN_y$, 0<x<4, 0<y<2) such as $Li_3N$, $SiS_2$ based glass ($Li_xSi_yS_z$, 0<x<3, 0<y<2, 0<z<4) such as $Li_3PO_4$—$Li_2S$—$SiS_2$, $P_2S_5$ based glass ($Li_xP_yS_z$, 0<x<3, 0<y<3, 0<z<7) such as LiI—$Li_2S$—$P_2S_5$ or mixtures thereof.

The aspect ratio of the plate-type inorganic particles may be 5 to 100, specifically, 50 to 100. If the aspect ratio of the plate-type inorganic particles is less than 5, there is no effect as compared with the case of using only the spherical inorganic material. If the aspect ratio of the plate-type inorganic particles is greater than 100, there is a problem that the surface quality of the separator, such as the surface protrusion of the inorganic particles, is degraded.

The aspect ratio of the spherical inorganic particles may be 1 to 2, particularly 1 to 1.5.

Here, the aspect ratio means the average value of the ratio (the length in the long axis direction/the length in the short axis direction) of the length in the long axis direction and the length in the short axis direction of the inorganic particles.

The average value of the aspect ratio, that is, the ratio of the length in the long axis direction and the length in the short axis direction of the inorganic particles can be obtained, for example, by image analysis of an image taken by a scanning electron microscope (SEM). In addition, the aspect ratio of the inorganic particles can also be obtained by image analysis of an image taken by SEM.

Figure 6:
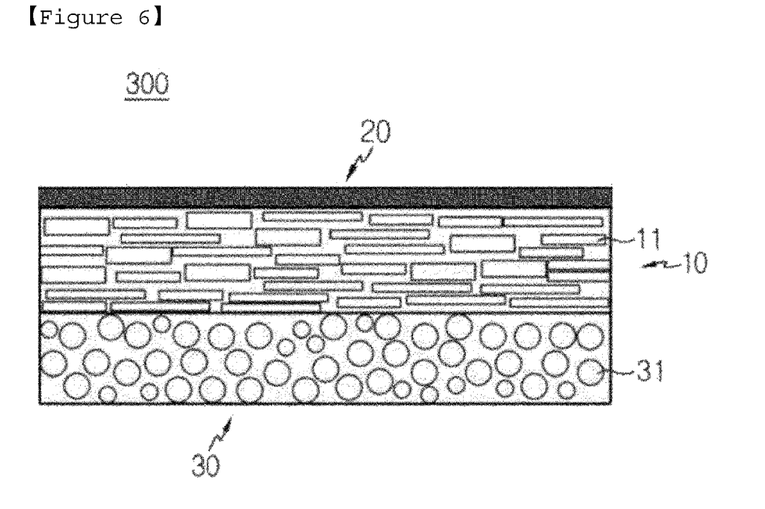
FIG. 6 is a schematic diagram of the porous separator according to one embodiment of the present invention.

In addition, the porous separator 300 according to one embodiment of the present invention shown on FIG. 6 comprises a porous layer 10 containing a plurality of plate-type inorganic particles 11 and a first binder polymer (not shown) positioned on part or all of the surface of the plate-type inorganic particles 11 to connect and fix between the plate-type inorganic particles; a metal layer 20 positioned on one surface of the porous layer; and a ceramic coating layer 30 formed on the other side of the porous layer.

If the porous separator further comprises a ceramic coating layer, output characteristics may be improved when manufactured into a battery.

To this end, a compound having a dielectric constant of 20 to 1000 may be coated as the ceramic coating layer, and specifically, inorganic particles such as $HfO_2$, $ZrO_2$, $BaSrTiO_3$ or $PbLaZrTiO_3$ or mixtures thereof may be coated.

The inorganic particles may be mixed with a binder (a second binder polymer) to be uniformly dispersed in the coating layer.

In the porous separator according to an aspect of the present invention, a polymer having a glass transition temperature (Tg) of −200 to 200° C. may be used as the first binder polymer and the second binder polymer to be used.

This is because the mechanical properties such as flexibility and elasticity of the finally formed porous separator can be improved.

Such a binder polymer faithfully serves as a binder that connects and stably fixes inorganic particles, thereby contributing to the prevention of deterioration of mechanical properties of the porous separator.

In addition, the first binder polymer and the second binder polymer do not necessarily have an ion conducting ability, but when a polymer having an ion conducting ability is used, the performance of the electrochemical device may be further improved. Therefore, one having a high dielectric constant possible as the first binder polymer and the second binder polymer can be used. In fact, since the degree of dissociation of the salt in the electrolyte solution depends on the dielectric constant of the solvent of the electrolyte solution, as the dielectric constant of the binder polymer is higher, the degree of salt dissociation in the electrolyte may be improved. The dielectric constant of the first binder polymer and the second binder polymer may be in the range of 1.0 to 100 (measurement frequency=1 kHz), in particular 10 or more. In addition to the above-described function, the first binder polymer and the second binder polymer may have characteristics that can indicate a high degree of swelling by an electrolyte solution by gelling upon impregnation of the liquid electrolyte solution.

Accordingly, the solubility parameter of the binder polymer, that is, the Hildebrand solubility parameter, is in the range of 15 to 45 $MPa^{1/2}$ or 15 to 25 $MPa^{1/2}$ and 30 to 45 $MPa^{1/2}$. Thus, hydrophilic polymers with more polar groups can be more used than hydrophobic polymers such as polyolefins.

The reason is that if the solubility parameter is less than 15 $MPa^{1/2}$ and more than 45 $MPa^{1/2}$, it may be difficult to swell by a conventional liquid electrolyte solution for batteries.

In the porous separator, the inorganic particles are charged and bound to each other in contact with each other by the first binder polymer and the second binder polymer, and thus an interstitial volume is formed between the inorganic particles, and the interstitial volume between the inorganic particles becomes an empty space to form pores.

That is, the first binder polymer and the second binder polymer attach inorganic particles to each other so that they remain bound together, for example, the first binder polymer and the second binder polymer connect and fix between the inorganic particles. In addition, the pores of the porous separator are pores formed by the interstitial volume between the inorganic particles being empty, which is a space defined by the inorganic particles which are substantially in contact with each other by the surfaces in a packed (closed packed or densely packed) structure.

The first binder polymer and the second binder polymer can be applied without limitation as long as they satisfy the weight average molecular weight described above, and are commonly used in the art, and the examples thereof may each independently be, but is not limited to, polyvinylidene fluoride, polyvinylidene fluoride-cohexafluoropropylene, polyvinylidene fluoride-co-trichloroethylene, polyimide, polymethylmethacrylate, polybutyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose and the like.

In addition, the weight of the first binder polymer relative to the total weight of the porous layer is 0.1 to 30% by weight, particularly 0.3 to 25% by weight, more particularly 0.5 to 20% by weight.

In addition, the weight of the second binder polymer relative to the total weight of the porous coating layer is 0.1 to 30% by weight, particularly 0.3 to 25% by weight, more particularly 0.5 to 20% by weight.

When the weights of the first binder polymer and the second binder polymer each satisfy these ranges, excess binder polymer can be present in the pores of the porous separator to be formed to prevent the problem of decreasing pore size and porosity, and the inorganic particles can be stably fixed by the binder polymer without being detached during the manufacturing phase of the porous separator or during the storage or operation of the electrochemical device with such a porous separator.

The porous separator according to an aspect of the present invention may further comprise other additives in addition to the above-described inorganic particles and the binder polymer.

As the additive, conventional additives used in the art may be used.

The porous separator according to one embodiment of the present invention may be prepared by first preparing a base layer composition comprising plate-type inorganic particles and first binder polymer, applying such a composition to one surface of a release substrate, and drying it and then removing the release substrate. In addition, the porous separator may be manufactured as a composite of an electrode-porous layer directly bonded to the electrode layer by applying the composition for forming the porous separator directly on one side of the electrode layer, such as positive electrode or negative electrode, and drying it.

First, the base layer composition may be prepared by dissolving the first binder polymer in a solvent and then adding plate-type inorganic particles and dispersing it. The plate-type inorganic particles may be added in a state of being crushed to have a predetermined average particle diameter in advance, or may be dispersed by adding inorganic particles to a binder polymer solution, and then crushing the inorganic particles by using a ball mill method while controlling them to have a predetermined average particle size.

The method of coating the base layer composition on the release substrate or the electrode layer is not particularly limited, but it is preferable to use slot coating, coma coating, curtain coating, micro gravure coating, spin coating, roll coating, or dip coating method.

The slot coating is possible to control the thickness of the coating layer in accordance with the flow rate supplied from the metering pump in such a way that the composition supplied through the slot die is applied to the front of the substrate. In addition, dip coating is a method of dipping and coating the substrate in the tank containing the composition, which is capable of adjusting the thickness of the coating layer depending on the concentration of the composition and the speed of taking the substrate out of the composition tank, and post-measuring through a Mayer bar, etc. after dipping in order to control the coating thickness more accurately.

Thus, the release substrate coated with a composition for forming a porous separator is dried at a temperature of, for example, 90 to 150° C. using a dryer such as an oven, and then a porous layer is prepared by removing the release substrate. As such a releasable substrate, a glass plate, a polyethylene-based film, a polyester-based film, or the like may be used, but is not limited thereto. Optionally, the surface of the release substrate may be surface-modified by corona treatment (for example, treatment for 10 to 30 seconds at a voltage of 0.5 to 1.5 kV) and the like.

Alternatively, when the base layer composition is directly coated on the electrode layer, the base layer composition may be dried in the same manner and manufactured as a composite of an electrode-porous layer bonded to the electrode layer.

The coating thickness of the porous layer formed by coating in the above manner may be 5 to 20 µm, particularly 5 to 20 µm.

Next, a porous coating layer composition may be coated on at least one surface of the prepared porous layer and then dried to further form a metal layer and a ceramic coating layer.

The ceramic coating layer may be prepared by dissolving a second binder polymer in a solvent and then adding inorganic particles and dispersing it, and as another method, a method of manufacturing a base layer composition may be similarly applied. The coating thickness of the ceramic coating layer formed by coating in the above manner may be 5 to 20 µm, particularly 1 to 5 µm.

In the present invention, porosity was measured using a Capillary flow porometer device of PMI company.

The metal layer may form a metal having a low Li diffusion barrier such as Al, In, Au, Ni, Mg, or the like through an evaporation or sputter process. The coating thickness of the metal layer formed by coating in the above manner may be 0.01 to 1 µm.

According to one embodiment of the present invention, it is preferable that the form of presence of the plate-type inorganic particles in the porous layer is substantially parallel to the plane of the porous layer.

Lithium Secondary Battery

The lithium secondary battery according to an aspect of the present invention comprises a positive electrode, a negative electrode, and a separator interposed between the positive electrode and the negative electrode wherein the separator is a porous separator according to one embodiment of the present invention described above.

The lithium secondary battery may comprise lithium metal or lithium alloy in the negative electrode.

In addition, the negative electrode and the metal layer of the porous separator may be in contact with each other.

The porous separator of the present invention can be used in an electrochemical device, the electrochemical device comprises all devices that undergo an electrochemical reaction, and specific examples thereof comprise capacitors such as all kinds of a primary battery, a secondary battery, a fuel battery, a solar cell, or a supercapacitor device. In particular, a lithium secondary battery comprising a lithium metal secondary battery, a lithium ion secondary battery, a lithium polymer secondary battery or a lithium ion polymer secondary battery is preferable.

Both electrodes of the positive electrode and the negative electrode to be applied with the porous separator of the present invention are not particularly limited, and can be prepared in the form of the electrode active material bound to the electrode current collector according to conventional methods known in the art. Non-limiting examples of the positive electrode active material of the electrode active material may be a conventional positive electrode active material that can be used for the positive electrode of the conventional electrochemical device, and in particular, it is preferable to use lithium manganese oxide, lithium cobalt oxide, lithium nickel oxide, lithium iron oxide or a lithium composite oxide in combination thereof. Non-limiting examples of the negative electrode active material may be conventional negative electrode active materials that can be used for the negative electrode of the conventional electrochemical device, and in particular, lithium adsorbents such as lithium metal or lithium alloy, carbon, petroleum coke, activated carbon, graphite or other carbons are preferable. Non-limiting examples of the positive electrode current collector comprise a foil made by aluminum, nickel, or a combination thereof. Non-limiting examples of the negative electrode current collector comprise copper, gold, nickel, or copper alloy or combinations thereof.

The electrolyte solution that can be used in the electrochemical device of the present invention may be, but is not limited to, an electrolyte solution prepared by dissolving or dissociating a salt such as structure $A^+B^-$ in an organic solvent, wherein $A^+$ is an alkali metal cation such as $Li^+$, $Na^+$, or $K^+$ or an ion consisting of a combination thereof, and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, or $C(CF_2SO_2)_3^-$ or an ion consisting of a combination thereof, and the organic solvent consists of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane Tetrahydrofuran, N-methyl-2-pyrrolidone (NMP), ethylmethyl carbonate (EMC), gamma butyrolactone (g-butyrolactone) or mixtures thereof.

The injection of the electrolyte solution may be performed at an appropriate step in the battery manufacturing process depending on the manufacturing process and required physical properties of the final product. That is, it may be applied before battery assembly or at the final stage of battery assembly.

Hereinafter, the present invention will be described in detail by way of examples to describe the present invention in detail. However, the examples according to the present invention can be modified into various other forms, and the scope of the present invention should not be construed as being limited to the examples described below. The examples of the present invention are provided to enable a person skilled in the art to more fully understand the present invention.

EXAMPLES

Example 1

<Preparation of Porous Separator>

After mixing PVdF-HFP polymer binder (LBG Grade from Arkema company) and inorganic particles (alumina, NW-710 Grade from T-cera company, aspect ratio=67) in a ratio of 2:8, the mixture was mixed with a solvent of N-methyl-2-pyrrolidone (NMP) at a solid concentration of 40% to prepare a coating solution.

The prepared coating solution was coated with an applicator on a polyethylene terephthalate (PET) film (SKC company, RX12G 50 μm) surface-treated by a corona of 0.7 Kw intensity, and then dried in a Mathis oven at 130° C. for 5 minutes to prepare a PET film coated with a porous separator having a thickness of 100 μm.

The PET film coated with the porous separator was rolled on a roll press machine (Calendering machine, CIS company CLP-2025H) to form a porous separator having a thickness of 20 μm and then peeled off the PET film.

Thereafter, an aluminum metal layer of 0.5 μm was formed on one surface of the porous separator under the conditions of 10 mTorr vacuum and 1 kV in the Ar gas atmosphere using a Sputtering Systems from Novellus company.

<Manufacture of Lithium Secondary Battery>

A positive electrode mixture was prepared by mixing 96.7 parts by weight of $LiCoO_2$ serving as a positive electrode active material, 1.3 parts by weight of graphite serving as a conductive agent and 2.0 parts by weight of polyvinylidene fluoride (PVdF) serving as a binder. The obtained positive electrode mixture was dispersed in 1-methyl-2-pyrrolidone serving as a solvent to prepare a positive electrode mixture slurry. The slurry was coated, dried, and pressed on both sides of an aluminum foil having a thickness of 20 μm, respectively, to prepare a positive electrode.

As a negative electrode, a Limetal electrode (Honzo company, Japan) in which a 100% Li metal layer was formed with a thickness of 20 μm on a copper foil current collector was used.

LiPF6 was dissolved in a concentration of 1.0 M in an organic solvent obtained by mixing ethylene carbonate (EC), diethyl carbonate (DEC), and dimethyl carbonate (DMC) in a composition of 1:2:1 (volume ratio), and 2 parts by weight of vinylene carbonate based on 100 parts by weight of an organic solvent was dissolved to prepare a nonaqueous electrolyte solution.

The porous separator was interposed between the prepared positive electrode and the negative electrode, and the electrolyte solution was injected to prepare a lithium secondary battery in the form of a coin-cell. At this time, the metal layer of the porous separator is interposed in contact with the negative electrode.

Example 2

A coating solution was prepared by mixing PVdF-HFP polymer binder (LBG Grade from Arkema company) with $BaSrTiO_3$ in a ratio of 1:9 and then mixing the mixture with a solvent of N-methyl-2-pyrrolidone (NMP) at a solid concentration of 20 wt. %. A lithium secondary battery was prepared in the same manner as in Example 1, except that the coating solution is coated on the other surface of the porous separator prepared in Example 1, in which no metal layer is formed, in the same manner as in Example 1 to prepare a porous separator.

Comparative Example 1

A lithium secondary battery was prepared in the same manner as in Example 1, except that PVdF-HFP polymer binder (LBG Grade from Arkema company) and inorganic particles (Alumina, NW-710 Grade from Ticera company) are mixed in a ratio of 1:9, and no metal layer is formed.

Comparative Example 2

A lithium secondary battery was prepared in the same manner as in Example 1, except that the CSP20 product from Optodot company is used as a porous separator.

Comparative Example 3

A lithium secondary battery was prepared in the same manner as in Example 1, except that no metal layer is formed.

Experimental Example 1: Analysis of the Lifetime Characteristics of Battery

Using a Small Cell cycler device from PNE SOLUTION company, the charging was performed by CC charging at a constant current (CC) of 0.2 C until it becomes 4.25V, and then charging once with a current cut-off of 5% relative to 1 C at a constant voltage (CV) of 4.25V, and thereafter, the discharging was performed at a constant current of 0.5 C until it becomes 3V, which constitute 1 cycle. This cycle was performed repeatedly.

The cycle performance according to the cycle characteristics and 2 C discharging capacity relative to 0.2 C were measured. The results are shown in Table 1 below.

TABLE 1

|  | 2C discharging capacity relative to 0.2C (%) | Cycle performance (capacity retention under 90%) |
|---|---|---|
| Example 1 | 91% | 38 cycle |
| Example 2 | 96% | 46 cycle |
| Comparative Example 1 | 91% | 30 cycle |
| Comparative Example 2 | 91% | 20 cycle |
| Comparative Example 3 | 91% | 27 cycle |

Referring to Table 1, it was found that the results of applying the porous inorganic separators of Comparative Examples 1 to 3 show that fading starts before 30 cycles, whereas the porous separators of Examples 1 and 2 show stable discharge capacity even at longer cycles, and also show better 2 C discharging capacity relative to 0.2 C. It is analyzed that the porous separators of Examples 1 and 2 have excellent characteristics of inhibiting the growth of the lithium dendrites.

Experimental Example 2: Analysis of High Temperature Stability of Separator

The separator was exposed for 30 minutes at a temperature of 150 degrees using a convection oven. The high temperature stability of the separator was examined in a manner of calculating the shrinkage rate by measuring the area of the separator before and after exposure.

As a result, in the case of Example 1, shrinkage of 8% occurred relative to the area, and in the case of Example 2, shrinkage of 5% occurred. In comparison, shrinkage of 6% occurred in Comparative Example 1, shrinkage of 80% in Comparative Example 2, and shrinkage of 10% in Comparative Example 3. It is believed that the high temperature stability is improved due to the inorganic particles and the metal layers coated on the surfaces of the porous separators of Examples 1 and 2.

All simple modifications and variations of the present invention fall within the scope of the present invention, and the specific scope of protection of the present invention will be clarified by the appended claims.

The invention claimed is:

1. A porous separator comprising:
a porous layer containing a plurality of plate-shaped inorganic particles and a first binder polymer positioned on a part or all of a surface of the plate-shaped inorganic particles to connect and fix between the plate-shaped inorganic particles;
a metal layer disposed on a surface of the porous layer; and
a ceramic coating layer disposed on another surface of the porous layer which is opposite to the surface on which the metal layer is disposed,
wherein the porous separator does not include a polymer other than the first binder polymer, and the ceramic coating layer includes $BaSrTiO_3$ or $PbLaZrTiO_3$.

2. The porous separator according to claim 1, wherein the plate-shaped inorganic particles comprise alumina, silica, zirconia, titanium dioxide, magnesia, ceria, yttrium oxide, zinc oxide, iron oxide, barium titanium oxide, alumina-silica composite oxide, or a mixture of two or more thereof.

3. The porous separator according to claim 1, wherein an aspect ratio of the plate-shaped inorganic particles is 5 to 100.

4. The porous separator according to claim 1, wherein an aspect ratio of the plate-shaped inorganic particles is 50 to 100.

5. The porous separator according to claim 1, wherein the metal layer contains metal (M) capable of reacting with lithium to form an alloy of $Li_xM$, wherein x is 1 to 2.25.

6. The porous separator according to claim 1, wherein the metal layer contains at least one metal selected from the group consisting of Al, In, Au, Ni, and Mg.

7. The porous separator according to claim 1, wherein the metal layer has a thickness of 0.01 to 1 μm.

8. The porous separator according to claim 1, wherein the ceramic coating layer has a dielectric constant of 20 to 1000.

9. The porous separator according to claim 1, wherein the porous layer further contains spherical inorganic particles.

10. The porous separator according to claim 1, wherein a weight of the first binder polymer relative to a total weight of the porous layer is 0.1 to 30% by weight.

11. The porous separator according to claim 1, wherein the ceramic coating layer further includes $HfO_2$.

12. The porous separator according to claim 1, wherein the ceramic coating layer further includes $ZrO_2$.

13. A lithium secondary battery comprising a positive electrode, a negative electrode, and the porous separator of claim 1 interposed between the positive electrode and the negative electrode.

14. The lithium secondary battery according to claim 13, wherein the negative electrode and the metal layer of the porous separator are in contact with each other.

15. The lithium secondary battery according to claim 13, wherein the lithium secondary battery comprises lithium metal or lithium alloy in the negative electrode.

* * * * *